United States Patent
Wong et al.

(10) Patent No.: US 6,934,872 B2
(45) Date of Patent: Aug. 23, 2005

(54) METHOD AND APPARATUS FOR OPTIMIZING CLOCK DISTRIBUTION TO REDUCE THE EFFECT OF POWER SUPPLY NOISE

(75) Inventors: Keng L. Wong, Portland, OR (US); Hung-Piao Ma, Portland, OR (US); Tawfik M. Rahal-Arabi, Tigard, OR (US); Javed Barkatullah, Portland, OR (US); Edward A. Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 10/021,058

(22) Filed: Dec. 19, 2001

(65) Prior Publication Data

US 2003/0115493 A1 Jun. 19, 2003

(51) Int. Cl.[7] .............................. G06F 1/04; G06F 17/50
(52) U.S. Cl. ......................... 713/503; 713/500; 703/19
(58) Field of Search ............................................ 703/19

(56) References Cited

U.S. PATENT DOCUMENTS

| | | | | |
|---|---|---|---|---|
| 5,313,501 A | * | 5/1994 | Thacker | 375/369 |
| 5,627,736 A | * | 5/1997 | Taylor | 363/39 |
| 6,075,832 A | * | 6/2000 | Geannopoulos et al. | 375/375 |

* cited by examiner

Primary Examiner—Lynne H. Browne
Assistant Examiner—Matthew Henry
(74) Attorney, Agent, or Firm—Blakely, Sokoloff, Taylor & Zafman LLP

(57) ABSTRACT

A method and apparatus for optimizing clock distribution in a circuit to reduce the effect of power supply noise. Parameters are determined including: a response curve of a power source for a circuit, a delay sensitivity of a clock net in the circuit to the power source, a delay sensitivity of a data net in the circuit to the power source, a data delay for the data net, and a clock delay for the clock net. The clock delay is adjusted to reduce the effect of power supply noise on the data net. The adjusting is based on the response curve of the power source, the delay sensitivity of the clock net, the delay sensitivity of the data net, the data delay, and the clock delay. The adjusting includes adding a pre-distribution clock delay.

21 Claims, 11 Drawing Sheets

METHOD AND APPARATUS FOR OPTIMIZING CLOCK DISTRIBUTION TO REDUCE THE EFFECT OF POWER SUPPLY NOISE

BACKGROUND

1. Field of the Invention

This invention relates to the effect of power supply noise on electrical circuits on a die, and more specifically to optimization of the clock distribution on the die to reduce the effect of power supply noise.

2. Background

Electronic devices, such as microprocessors, are steadily operating at faster and faster speeds. As microprocessors run at higher and higher speeds, the power delivered to the microprocessor by a power supply starts to become an issue. As power is delivered from a power source to the individual components and devices on the die of a microprocessor, voltage drops occur. For example, devices on a die may receive only 1.0 volt from a power source that is supplying 1.2 volts due to a voltage droop. Decoupling capacitors are used on a die to help reduce voltage droop. However, decoupling capacitors cost area on the die and also cost power due to gate oxide leakage.

Power source voltage droops affect the speed at which an electronic device (e.g., microprocessor) may operate. During normal operation of a microprocessor (or any sequential machine), noise is generated from instantaneous switching. Voltage supply noise modulates the delay of data paths. Voltage droops reduce the maximum frequency of operation of the microprocessor. As microprocessor speeds increase, the voltage droop magnitude increases and the maximum frequency of the microprocessor is further adversely affected. The clock distribution delay is also modulated by this supply noise. Moreover, clock period modulation may also be detrimental to maximum frequency of operation.

Therefore, a need exists for method and apparatus that provide design of a circuit on with higher tolerance to power supply noise.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to method and apparatus for optimization of clock distribution on a die such that tracking between clock distribution and data delay is allowed when subjected to power supply perturbation, thus achieving noise rejection. In method and apparatus according to the present invention, an on-die circuit does not experience the maximum impact of voltage noise therefore less on-die capacitance needs to be dedicated to reduce the voltage droop. Thus, a higher frequency of operation can be achieved by the circuit at a lower leakage power, as well as less silicon area being taken up on the die.

To help illustrate the present invention, a method of visualization on the impact of voltage noise (droop) on a delay line called Normalized Delay Representation (NDR)

will be used. This representation allows complete integration of voltage noise over time while also taking into account the inherent sensitivity of the delay line to noise. The delay or delay line represents the delay experienced by data as it travels from a source latch or storage device to a destination latch or storage device. This delay may be caused by transmission from the source latch to the destination latch through a transmission medium (e.g., channel, wires, etc.), devices (e.g., transistors), or gates, (e.g., drivers, etc.) that exist in the path of the data transferred between the source latch and the destination latch. From a point of view of the clock, the delay line represents delay from the source of the clock (e.g., phase locked loop (PLL)) to the destination latch. The delay may consist of many devices, gates, wires, etc., or a combination thereof.

Figure 1A:
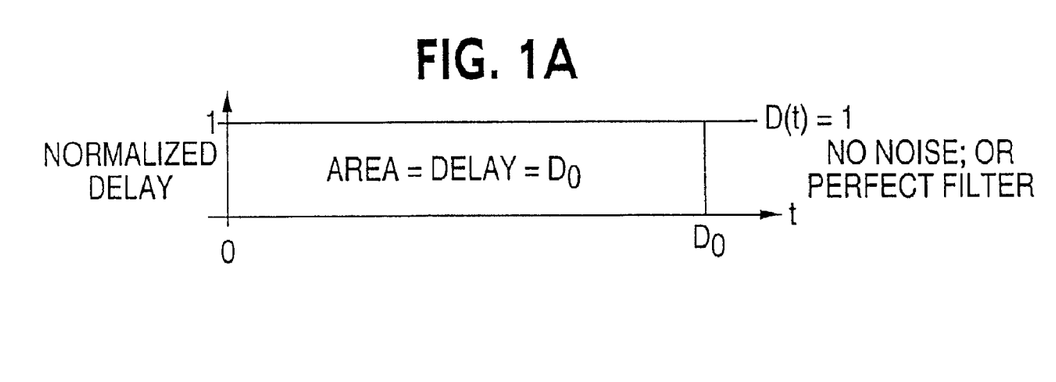
FIGS. 1A and 1B are diagrams of delay as influenced by power supply noise according to an example embodiment of the present invention.
Figure 1B:
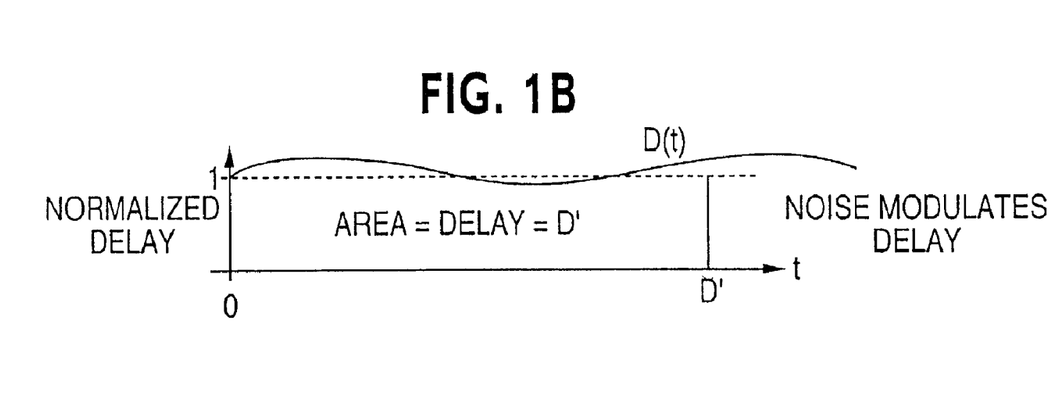

FIGS. 1A and 1B show diagrams of delay as influenced by power supply noise according to an example embodiment of the present invention. In both figures, the delay is equal to the area under the curve, where time is shown on the X-axis and normalized delay is shown on the Y axis. For a delay line with a nominal delay $\Delta 0$, its delay is a function of the DC power supply level Vcc0. For example, $$\Delta 0 = K/(Vcc0 - Vt), \quad (1)$$

where K is a constant and Vt is the threshold voltage. Noise is involved by making Vcc a function of time, i.e., Vcc(t). The delay can be calculated as a function of Vcc(t) by imposing a sensitivity curve that is a function of time, i.e., $$\Delta(t) = K/(Vcc(t) - Vt). \quad (2)$$

Dividing the Eq. 1 and Eq. 2 produces a normalized delay $$D(t) = \Delta(t)/\Delta 0 = (Vcc0 - Vt)/(Vcc(t) - Vt). \quad (3)$$

D(t) represents the instantaneous delay of the data due to the voltage (i.e., power supply) and is nominally '1'. This is shown in FIG. 1A that represents normalized delay when no noise is present. Instantaneous change in Vcc(t) pushes D(t) above or below the nominal value of one. This representation is shown in FIG. 1B that represents noise modulated delay. The total delay as modulated by noise can be written as integral of D(t) over the time duration of interest as shown by Eq. 4 below:

$$D' = \int_0^{D'} D(t)dt \approx \int_0^{D_0} D(t)dt \quad (4)$$

Eq. 4 represents the delay as shown by the area under the curve D(t) in FIG. 1B. In FIG. 1B, the portion of the curve D(t) that is above the line denoting a normalized delay of one signifies increased noise and increased voltage droop, therefore, reducing the speed at which the data travels. Conversely, the portion of the curve below the normalized delay signifies an increase in power supply voltage and, therefore, an increase in the speed of the data. As mentioned previously, D(t) represents the instantaneous delay of the data due to the voltage. A similar diagram may be shown representing clock delay where a curve, C(t), represents the clock relative delay response to power supply voltage. This will be illustrated later.

Figures 2A, 2B:
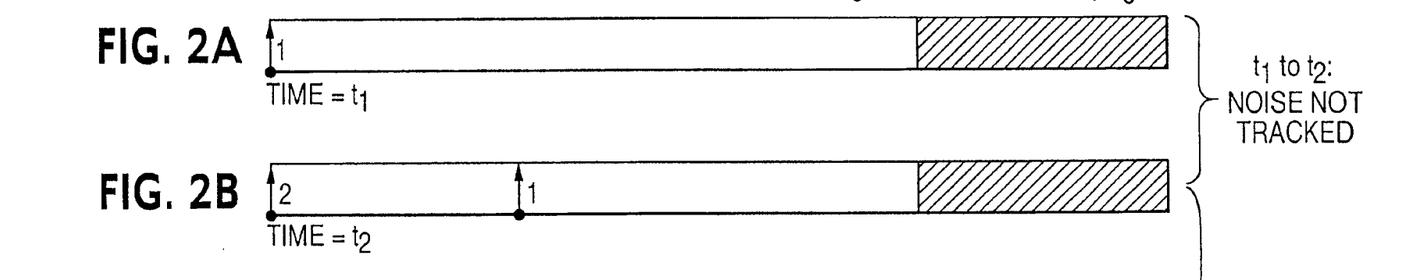
FIGS. 2A–2E are diagrams of propagating clock edges where data delay is appended to clock delay according to an example embodiment of the present invention.

FIGS. 2A–2E show diagrams of propagating clock edges where data delay is appended to clock delay according to an example embodiment of the present invention. $C_0$ represents clock distribution delay and $D_0$ represents data path delay. In FIGS. 2A–2E, the data path delay is shown appended to the clock distribution delay. FIG. 2A shows a diagram representing a time, $t_1$, where a first rising edge (shown as arrow with '1') of a clock originates from a clock distribution source towards a generation latch. FIG. 2B shows a diagram representing a time, $t_2$, where a second rising edge (shown as arrow with '2') of the clock originates from the clock distribution source towards a sampling latch. As shown in FIG. 2B, clock edge 1 has propagated along the clock distribution delay path $C_0$. The time between $t_1$ and just before $t_2$, power supply noise may not be tracked.

Figure 2C:
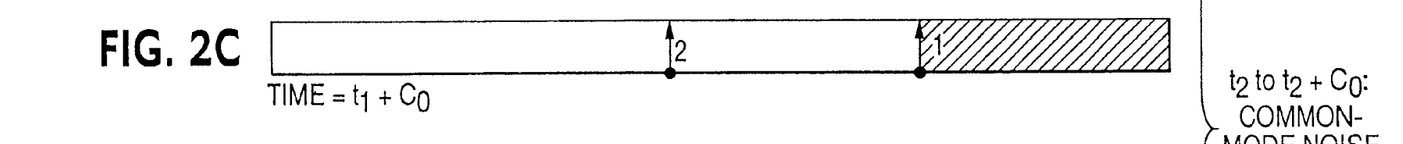
Figure 2D:
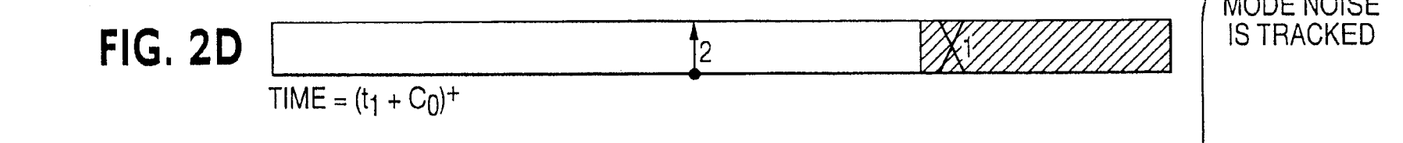
Figure 2E:
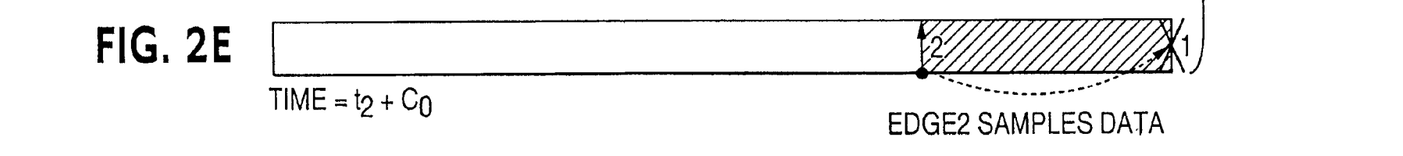

FIG. 2C shows a diagram representing a time $t_1 + C_0$. During this time, clock edge 1 has reached the generating latch. FIG. 2D shows a diagram representing a time equal to a little past $t_1 + C_0$ during which data starts propagating from the generating latch through data path delay $D_0$. FIG. 2E shows a time equal to $t_2 + C_0$. During time $t_2 + C_0$ clock edge 2 has now arrived at the sampling latch and is sampling the data, which has also arrived at the sampling latch. From time $t_2$ to time $t_2 + C_0$ common mode noise is being tracked. When $t_1$ and $t_2$ exist, both are sampling the power supply noise.

One can visualize the impact of noise using a NDR on concatenated delay lines with different sensitivities to Vcc. The combination of a clock distribution delay followed by a data delay represents the situation in a microprocessor where a first clock edge is launched (by a clock generator) down the clock distribution, followed by a second clock edge. These two clock edges define a duration of interest (e.g., a clock cycle). At the end of the clock distribution, data is originated from the first clock edge via a transmitting latch. As this data transition flows in the data delay, the second edge continues towards the end of the clock distribution, at which time it samples the data transition, which has just terminated at its receiving latch.

Figure 3:
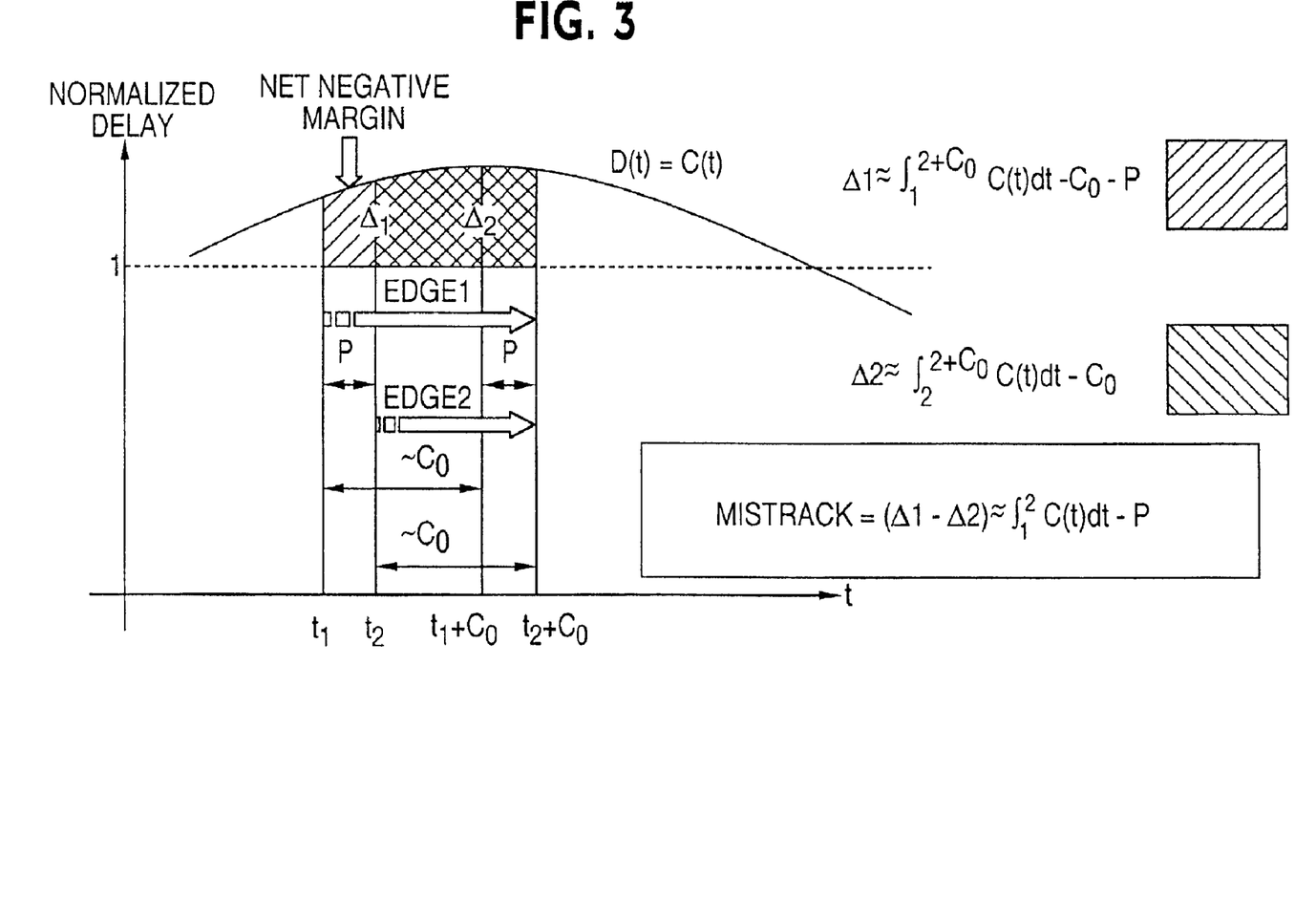
FIG. 3 is a graph of timing margin where clock delay sensitivity equals data delay sensitivity according to an example embodiment of the present invention.

FIG. 3 shows a graph of timing margin where clock delay sensitivity equals data delay sensitivity according to an example embodiment of the present invention. The X-axis represents time and the Y-axis represents a normalized delay. D(t) represents the data's relative response to power supply voltage droop. C(t) represents the clock's relative response to a power supply voltage droop. In the example embodiment in FIG. 3, D(t) is equal to C(t). The single curve represents the fact that these two responses have coincident waves. $\Delta 1$ represents the influence of the power supply on the first clock edge ($t_1$). This period of influence is shown by the diagonal lines going from left to right in an upward direction underneath the curve and is represented by the following equation:

$$\Delta 1 \approx \int_{t_1}^{t_2 + C_0} C(t)dt - C_0 - P \quad (5)$$

$\Delta 2$ represents the influence of the power supply on the second clock pulse ($t_2$). $\Delta 2$ is represented on the graph by the diagonal lines that go from left to right in a downward direction underneath the curve and is represented by the following equation:

$$\Delta 2 \approx \int_{t_2}^{t_2 + C_0} C(t)dt - C_0 \quad (6)$$

P represents one clock period. $C_0$ represents clock distribution delay. Time $t_1$ represents when the first clock edge (generation edge) is launched. Time $t_2$ represents the time when the second clock edge (sampling edge) is launched. At time $t_1 + C_0$, the first clock edge arrives at the end of the clock distribution delay. At time $t_2 + C_0$, the second clock edge has reached the sampling latch.

As shown in FIG. 3, portions of Δ1 overlap with the area under the curve for Δ2. The net impact of the voltage droop is equal to Δ1–Δ2. This represents the net amount of time lost or gained due to the voltage droop of the power supply. In this particular example embodiment, this can be represented by the following equation:

$$\text{Mistrack} = (\Delta 1 - \Delta 2) \approx \int_{t_1}^{t_2} C(t)dt - P \qquad (7)$$

Therefore, FIG. 3 reinforces the previous conclusion that when the first edge is launched, and the second is not, the first edge experiences noise by itself.

Figure 4:
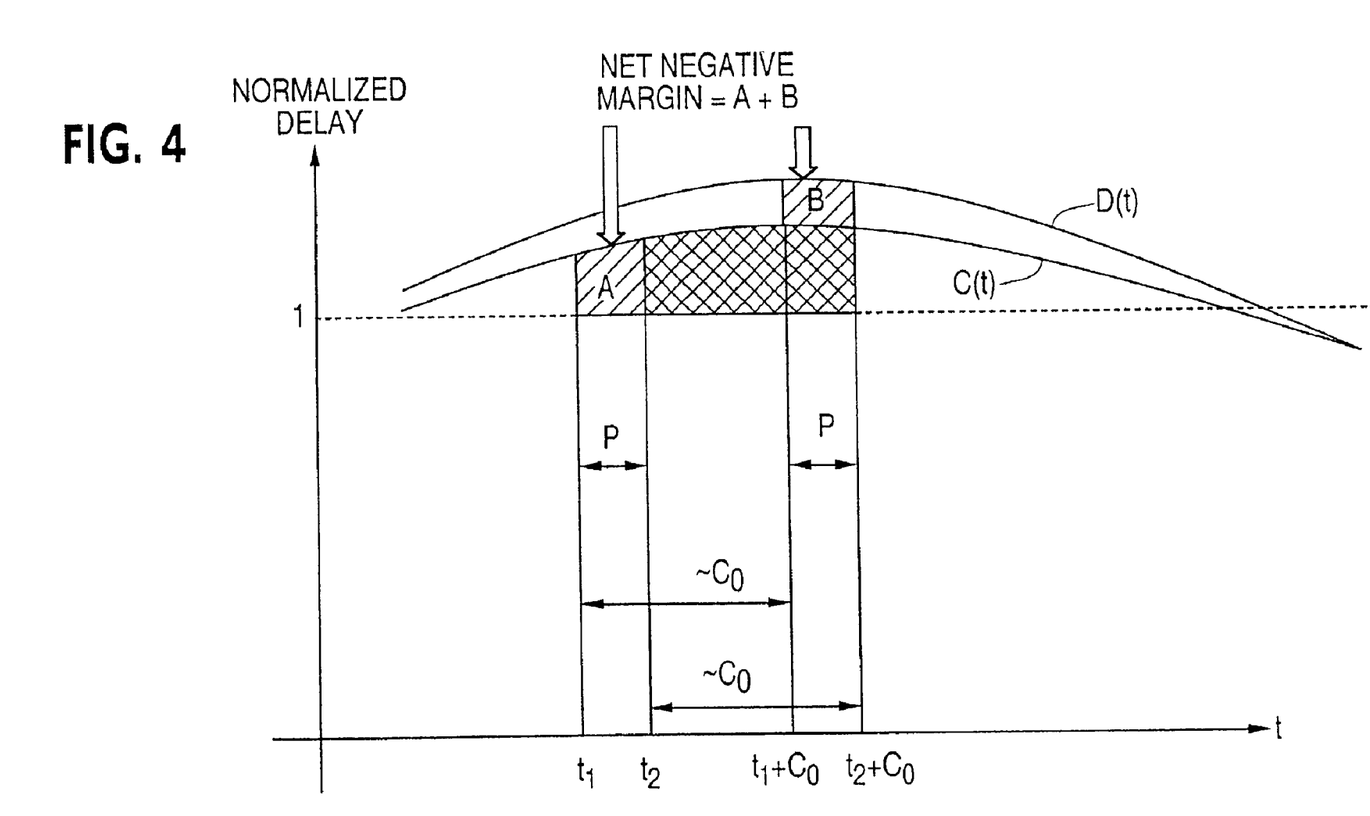
FIG. 4 is a graph of a timing margin where the clock delay sensitivity is less than the data delay sensitivity according to an example embodiment of the present invention.

FIG. 4 shows a graph of a timing margin where the clock delay sensitivity is less than the data delay sensitivity according to an example embodiment of the present invention. In this example embodiment, the clock delay sensitivity to the power supply voltage droop and the data sensitivity to the power supply voltage droop are different. This graph looks similar to that shown in FIG. 3 except that since the data sensitivity and clock sensitivity are different, individual curves are shown for C(t) and D(t). The area under the curves above the dotted line (a normalized delay of '1), represents slower clock delay and/or data delay due to power supply voltage droop. The portions of the curves below the normalized delay dotted line represents times with a faster clock and/or data transmission. In FIG. 4, a separation of sensitivities, coupled with separation in delay introduced by the clock distribution, has the impact of reducing the net impact of the droop. In fact, some increase in the clock distribution delay has the desired impact of reducing the net impact of the droop further. The net negative margin in this example embodiment is equal to the area in the box labeled "A" shown in FIG. 4 added to the area of the box labeled "B". Box B represents the present mismatch between data and clock sensitivity.

Figure 5:
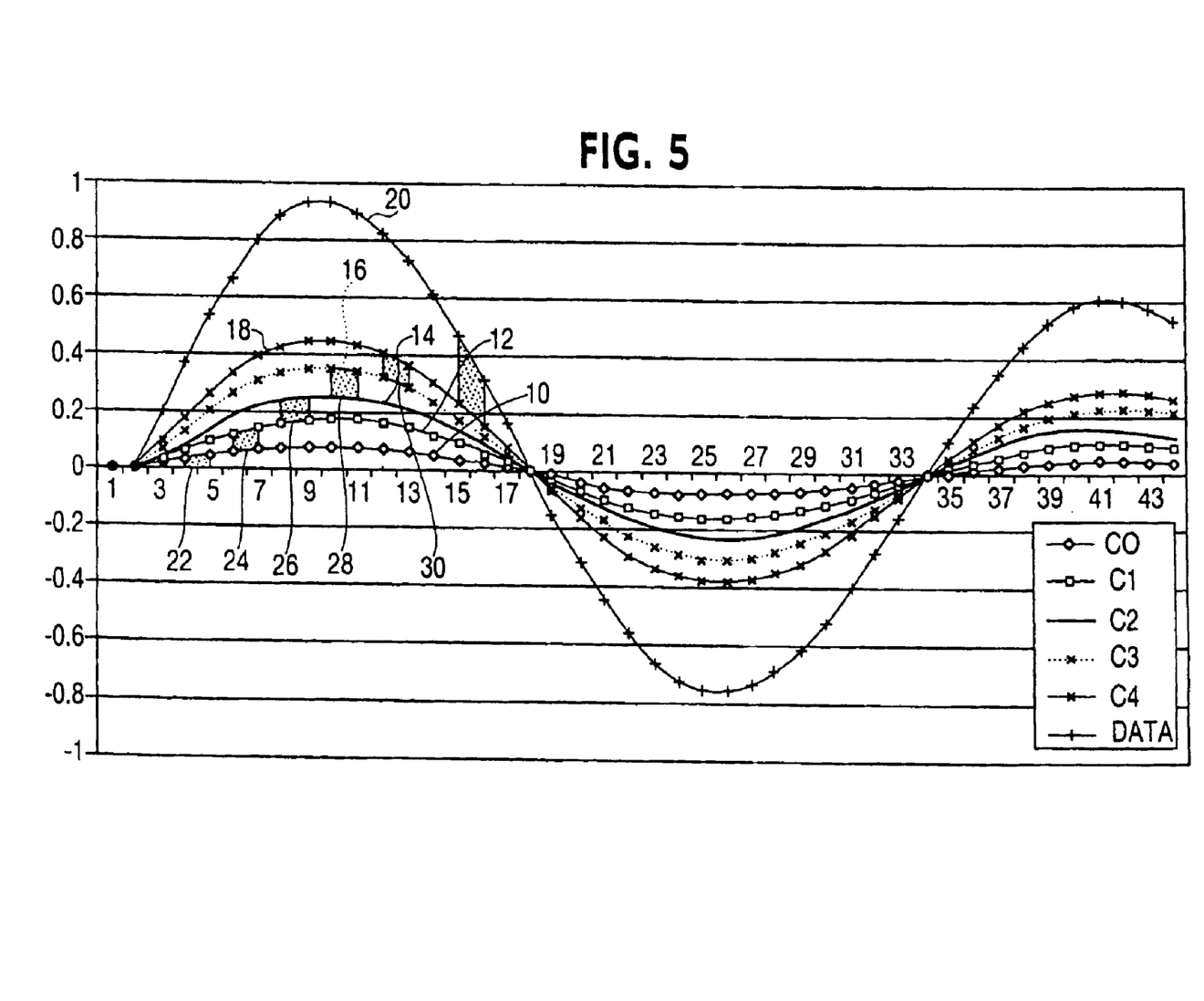
FIG. 5 is a graph of a multi-segment clock distribution timing margin according to an example embodiment of the present invention.

FIG. 5 shows a graph of a multi-segment clock distribution time margin according to an example embodiment of the present invention. For a delay path with multiple segments, the NDR-based graphical analysis can be generalized. In FIG. 5, a five segment clock delay distribution is followed by a data delay segment Assuming each clock segment has progressively increasing sensitivity to voltage noise, the net timing margin loss is represented by five integral deltas 22, 24, 26, 28, and 30 between the sensitivity curves. Each integral is separated from the next the delay of its corresponding segment. There is no distinction between clock and da segments for this generalization. Moreover, the NDR shown in FIG. 5 is a pure small signal representation, i.e., '1' has been subtracted from the Y-axis.

The X-axis of the graph represents time where the numbers shown along the X-axis represent clock cycles. The Y-axis represents non-normalized delay The 0 point on the Y-axis in FIG. 5 corresponds to the Y-axis '1' dashed line level in FIGS. 3 and 4. Each waveform 10, 12, 14, 16, and 18 in FIG. 5 represents a different segment in the clock distribution with a different sensitivity to voltage noise. The first waveform 20, with the '+' signs, represents the data. The different sensitivities of the five segments in the clock distribution path are represented by five individual waveforms. These are shown as waveforms 10, 12, 14, 16 and 18 (C0–C4). Waveform C0 is the waveform closest to the Y-axis '0' level and contains diamond shapes on the waveform. Waveform C1 is just above waveform C0 (in the rising portion of the waveforms) and contains solid boxes on the waveform. Waveform C2 is just above waveform C1 and is shown as a plain solid line. Waveform C3 is shown above waveform C2 and has 'X's on it. Waveform C4 is above waveform C3 but below the data waveform and is shown with asterisks on it. The boxes 22, 24, 26, 28, and 30 shown between the curves are all analogous to the "A" box shown in FIG. 4.

In methods and apparatus according to the present invention, a pre-clock distribution delay segment is added to minimize the impact of power supply noise/droop. In practice, the design of the clock distribution is constrained by factors such as toggling frequency to support, die size, power, etc. As a result, it is desirable not to constrain the clock distribution further by imposing programmable delay or sensitivity. By adding a pre-clock distribution segment according to the present invention, programmability is allowed while decoupling the segment from the design of the clock distribution.

Figure 6:
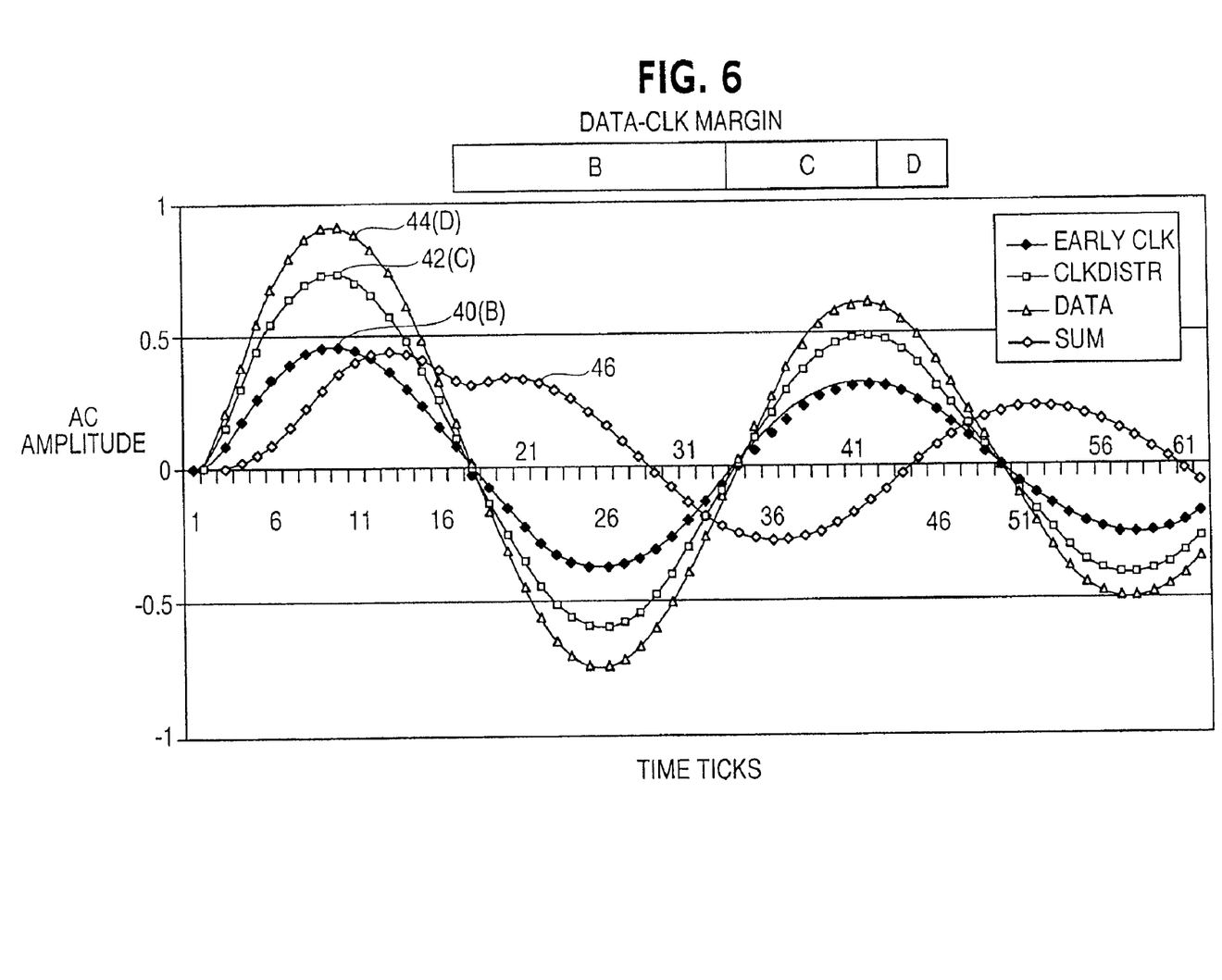
FIG. 6 is a graph illustrating a pre-clock distribution segment according to an example embodiment of the present invention.

FIG. 6 shows a graph illustrating a pre-clock distribution segment according to an example embodiment of the present invention. In this figure, three delay segments are shown, a pre-clock distribution segment 40(B), a clock distribution segment 42(C), and a data delay segment 44(D). The X-axis in FIG. 6 represents clock cycles and the Y-axis represents AC (alternating current) amplitude. The portions of the waveforms above the Y-axis, '0' line denote times when the data is slower than the clock, and the portions of the curves below the zero axis represent times when the data is faster than the clock. Therefore, the AC amplitude value on the Y-axis represents the margin loss. Waveform 46, (shown with diamond shapes on the various points along the curve), represents a sum curve which denotes the net margin at every cycle. Therefore, according to the present invention, by tweaking the length (delay) and supply sensitivity of B, the overall impact of power supply droop can be reduced to about 50% (as shown by the curve "sum").

Figure 7:
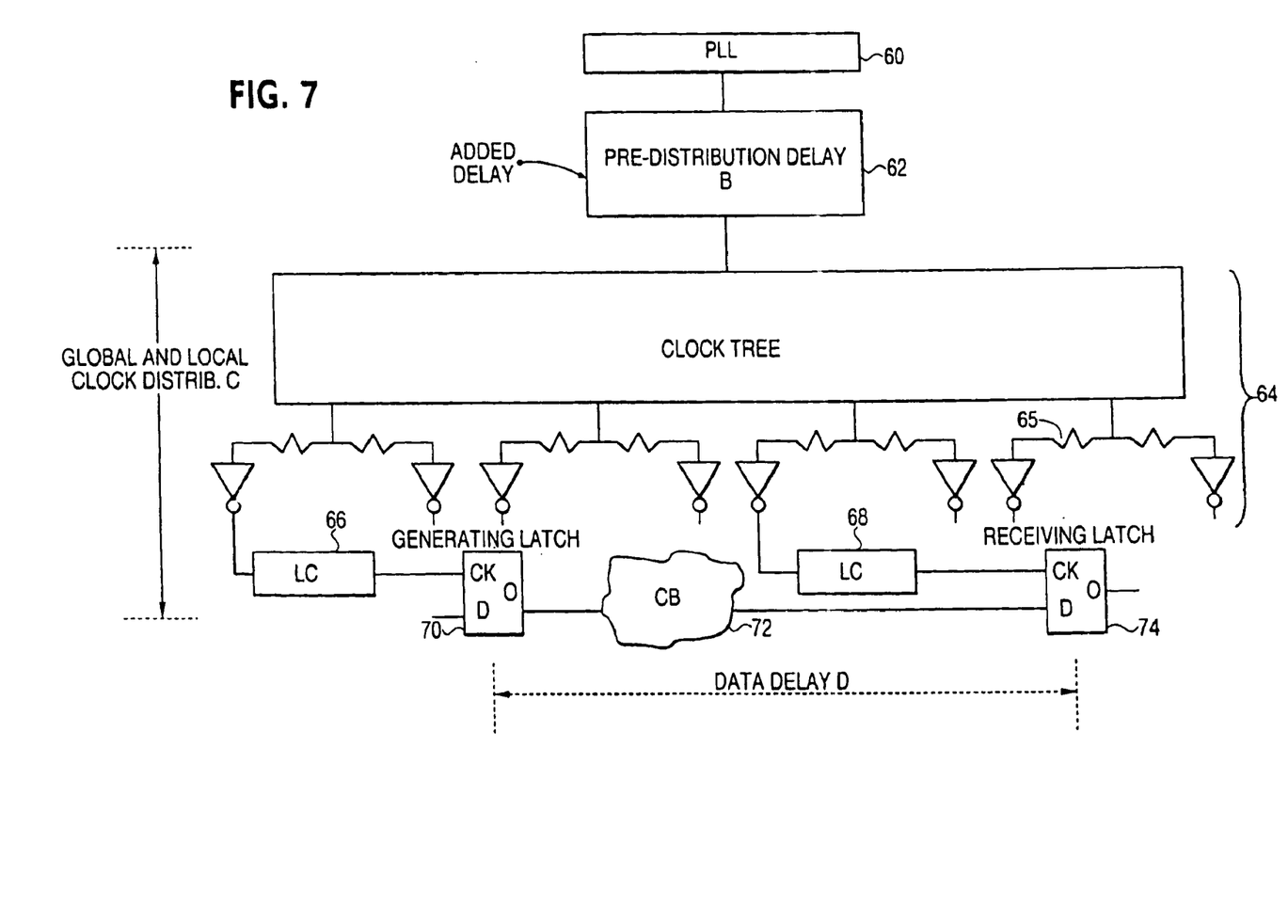
FIG. 7 is a diagram of a circuit for minimizing the impact of power supply noise according to an example embodiment of the present invention.

FIG. 7 shows a diagram of a circuit for minimizing the impact of power supply noise according to an example embodiment of the present invention. A Phase Locked Loop (PLL) 60 may be used to generate a clock signal. This clock signal may be fed into a pre-distribution delay section of logic 62. Pre-distribution logic 62 adds a predetermined amount of delay to the clock path of the clock signal. Pre-distribution logic 62 may consist of any electronic element. For example, pre-distribution logic 62 may consist of one or more transistors, logic gates, Field Effect Transistors (FETs), etc. The clock signal then leaves pre-distribution delay logic 62 and enters a clock tree 64 where the clock signal is distributed to all clocked devices in a circuit.

The clock signal leaves clock tree 64 and may enter local clock networks 66, 68 where the clock signal may then be fed to registers and latches such as generating latch 70 and a receiving latch 74. The path of the clock signal through clock tree 64 and local clock networks 66, 68 represent the global clock distribution path 'C'. The data path starts at the output of generating latch 70 through combinatorial logic 72 and ends at the input to receiving latch 74.

Figure 8:
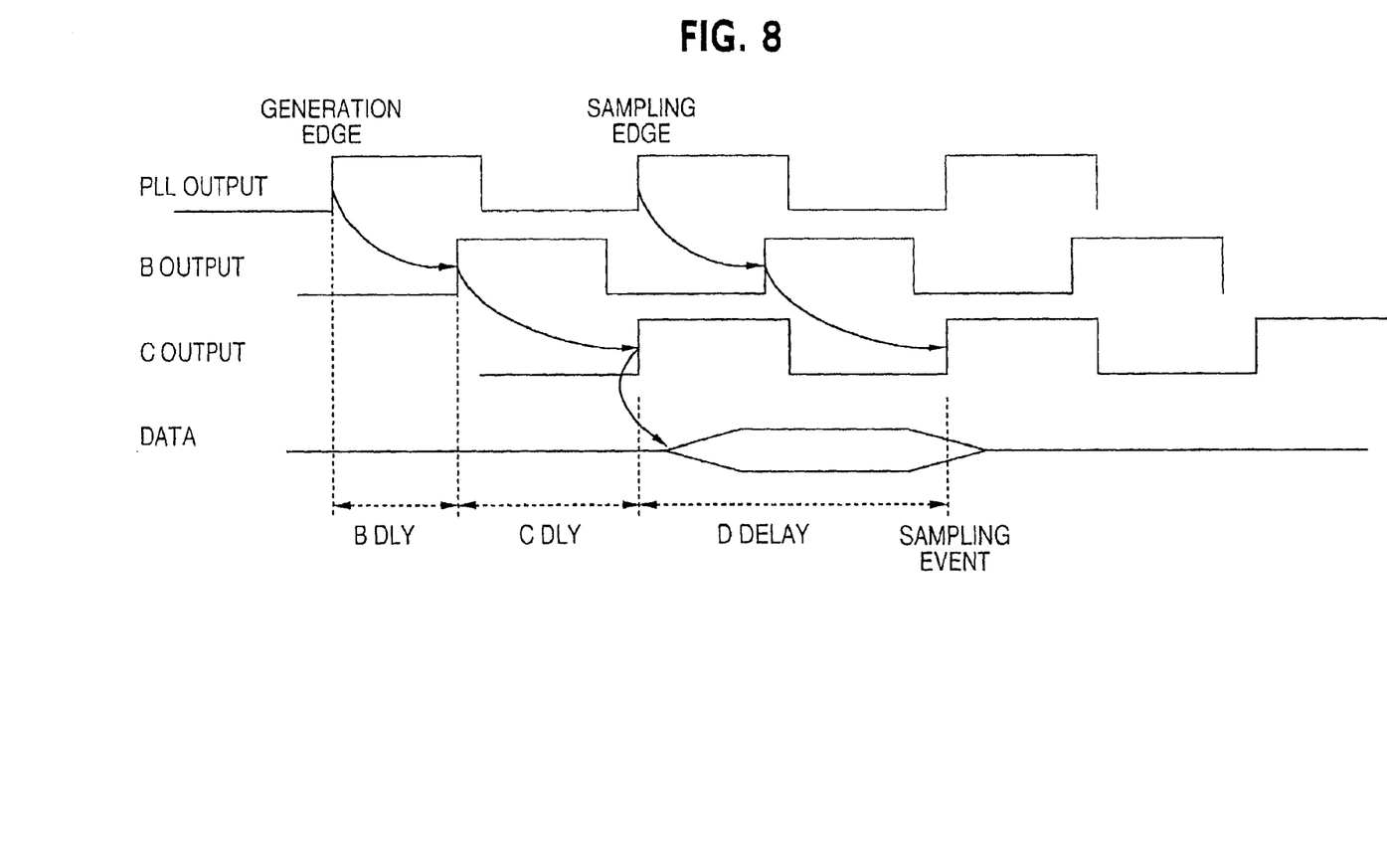
FIG. 8 is a timing diagram for the circuit of FIG. 7.

FIG. 8 shows a timing diagram for the circuit in FIG. 7. The phase lock loop generates a clock pulse that includes a first edge (generation edge) and a second edge (sampling edge). The pre-distribution clock delay circuit delays the output of the PLL, producing a delayed clock signal (B output). This delayed clock output may then be fed to clock tree 64 and local clock networks 66, 68 where it experiences clock distribution delay and is finally output from the clock tree (C output). The C output clock signal may then be used to clock the data from generating latch 70. The data then experiences a data delay (D) until it is finally captured at receiving latch 74 using the sampling edge.

Figure 9:
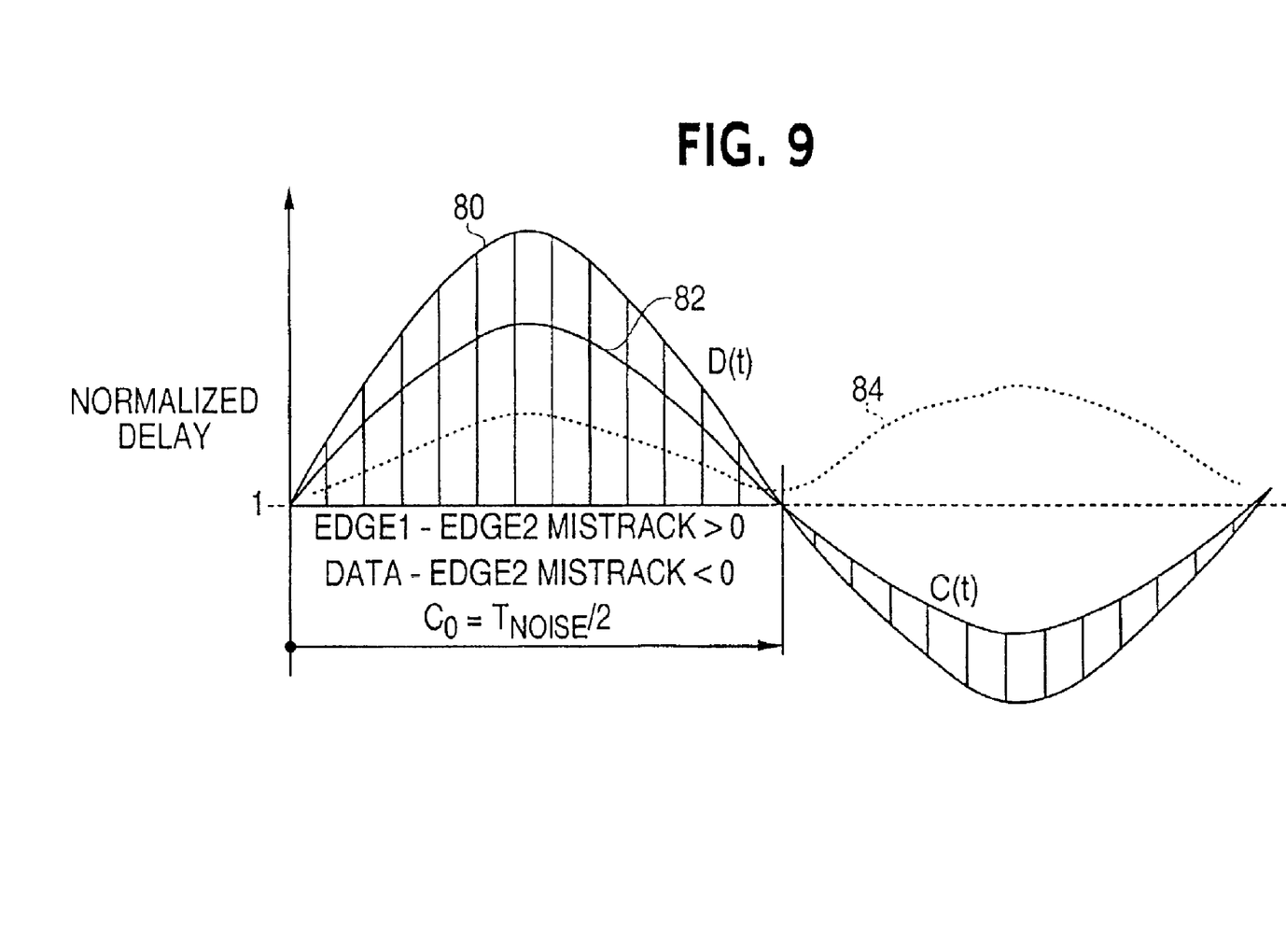
FIG. 9 is a graph illustrating changing sensitivity of the clock distribution according to an example embodiment of the present invention.

FIG. 9 shows a graph illustrating changing sensitivity of the clock distribution according to an example embodiment of the present invention. According to the present invention, tweaking the sensitivity of the clock distribution delay segment C results in increased reduction of the impact of power supply noise. As shown in FIG. 9, by making the sensitivity of the clock distribution delay segment $2/3$ that of the data sensitivity, and tuning the distribution length to half the noise period, the net impact of the power supply droop can be ideally reduced approximately 33%.

Waveform 80 represents the data distribution delay, D(t) and waveform 82 represents the clock distribution delay sensitivity, C(t). C(t) here represents the combination of B and C shown in FIG. 7. The dotted line waveform 84 represents the sum and is analogous to the sum waveform 46 shown in FIG. 6 previously. $C_0$ represents the nominal clock distribution delay C. It is desirable to tune $C_0$ such that it is equal to half the noise period of the power supply ($T_{noise}/2$). The shape of waveforms 80 and 82 are derived from the response to the voltage droop.

Therefore, according to the present invention, by tuning the length of the clock distribution delay $C_0$, and controlling the sensitivity of C(t) to be about $2/3$ of D(t), the resulting sum can be similar to $1/3$ the height of D(t). In the design specification of the circuit, the sensitivity of C(t) to the power supply may be controlled by controlling the amount of interconnect delay relative to the transistor delay. Generally, the clock distribution delay is safely under the $T_{noise}/2$ amount, therefore, more circuit elements may be added to get additional delay to make the delay at least half of the noise period. For example, if the noise delay is equal to 5 ns (nanoseconds), it is desirable that the clock distribution delay be equal to 2.5 ns. Moreover, analog elements may be used to get additional delay instead of using just interconnect and transistors. Analog elements may allow programmable sensitivity to the power supply.

Figure 10:
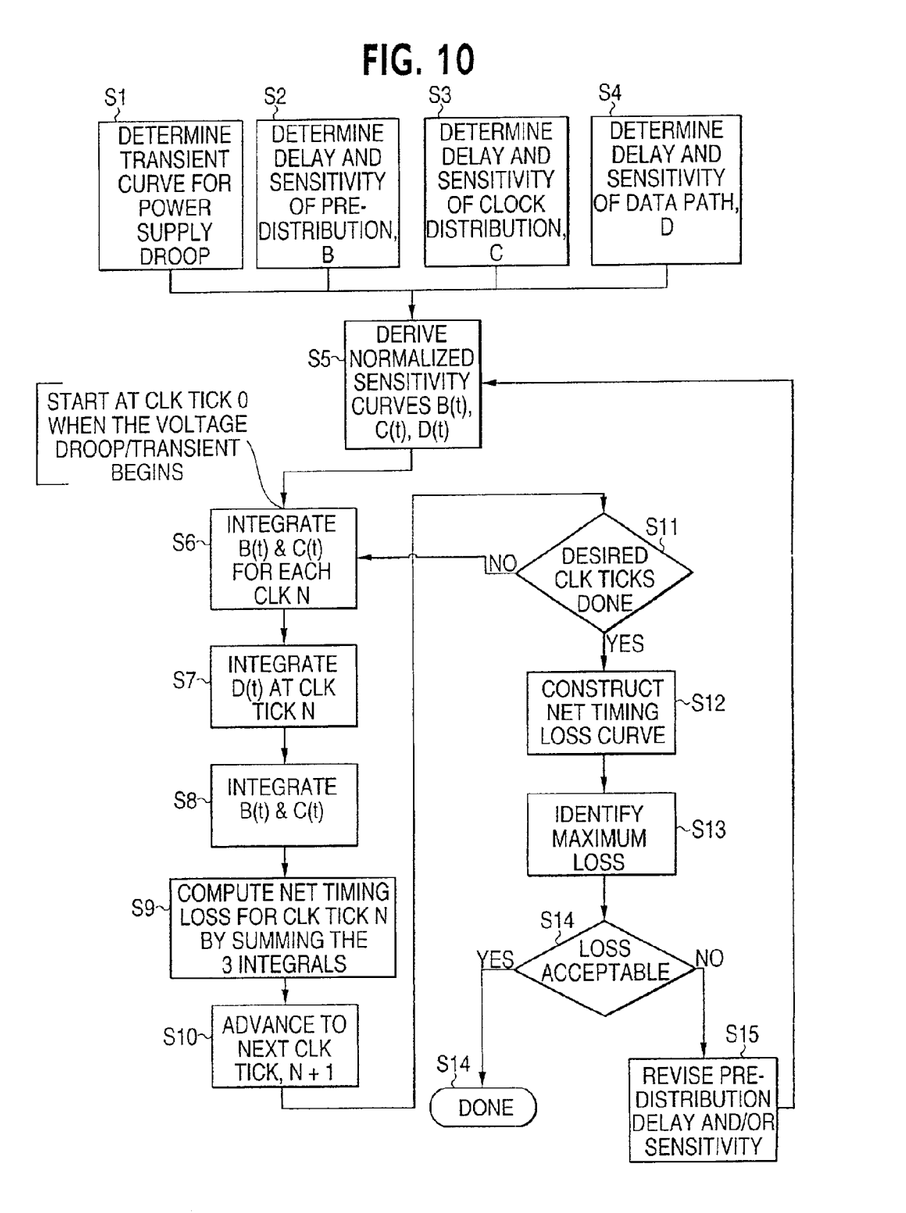
FIG. 10 is a flowchart of a process for optimizing clock distribution in a circuit to reduce the effect of power supply noise according to an example embodiment of the present invention.

FIG. 10 shows a flowchart of a process for optimizing clock distribution in a circuit to reduce the effect of power supply noise according to an example embodiment of the present invention. Initially, some input parameters and variables are determined. The transient curve for power supply droop is determined S1. The delay and sensitivity of the pre-distribution B is determined S2. The delay and sensitivity of the clock distribution C is determined S3. The delay and sensitivity of the data path D is determined S4.

The results of S1–S4 may then be used to derive normalized sensitivity curves for the pre-distribution B(t), clock distribution C(t), and data path D(t), S5. Starting at clock tick 0 when the voltage droop/transient begins, for each clock tick n, the delay error due to propagation of generation clock edge through B and C is computed by integrating B(t) and C(t), S6. The delay modulation for the data path is computed by integrating D(t) at clock tick n, S7. The delay error due to propagation of sampling clock edge through B and C is computed by integrating B(t) and C(t), S8. The net timing loss for clock tick n is computed by summing the integrals resulting from the previous integrations (S6, S7, S8), S9. An advance to the next clock tick, n+1, occurs, S10.

It may then be determined if the desired number clock ticks hay been analyzed, S11, and if not, S6 through S10 are repeated for the next clock tick. If the desired number clock ticks have be analyzed, a net timing loss curve may be constructed S12. The maximum loss may then be identified S13. A determination is made whether this loss is acceptable S14, and if so, the process is completed S14. If the loss is not acceptable, or further analysis or tweaking is desired, the pre-distribution delay and/or sensitivity is revised, S15, and S5 through S14 repeated.

Figure 11:
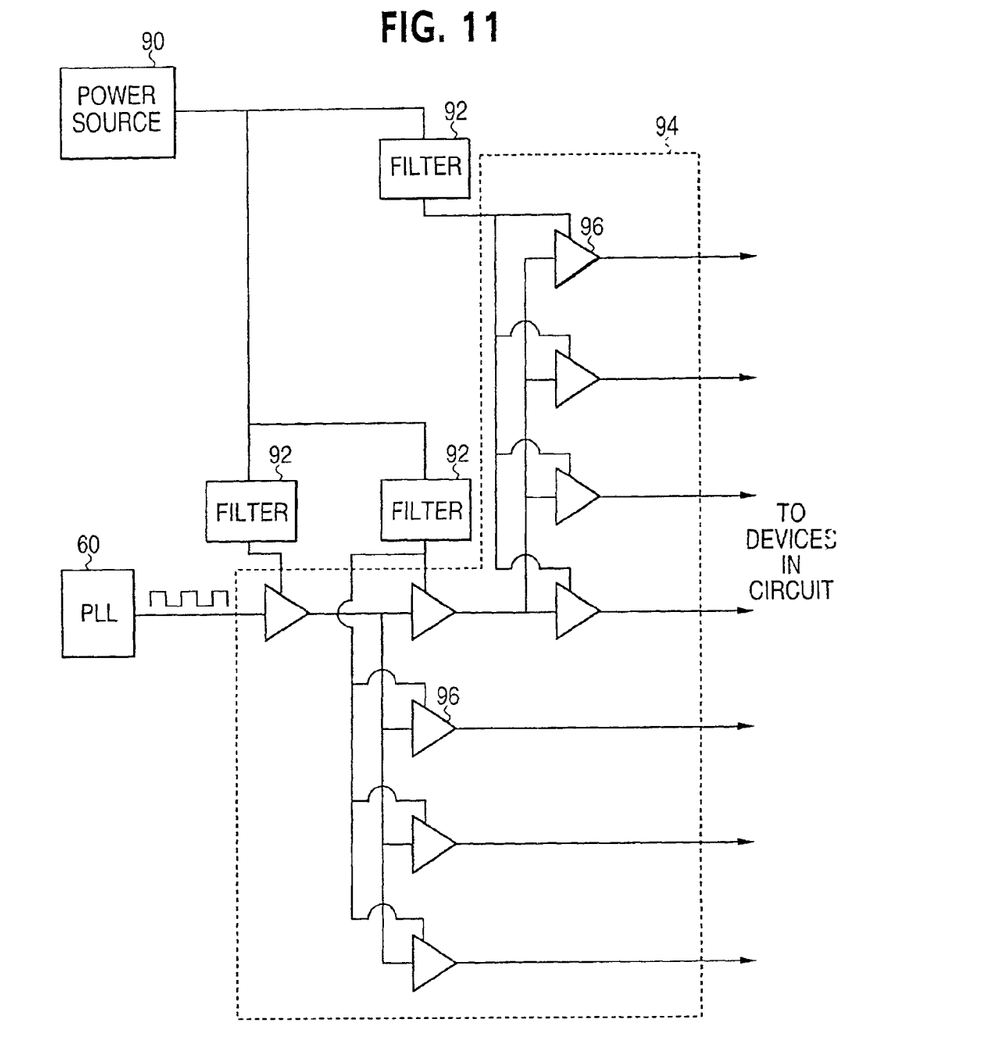
FIG. 11 is a diagram of a circuit for optimizing clock distribution in a circuit to reduce the effect of power supply noise according to another example embodiment of the present invention.

FIG. 11 shows a diagram of a circuit for optimizing clock distribution in a circuit to reduce the effect of power supply noise according to another example embodiment of the present invention. In this embodiment, instead of adding a pre-clock distribution delay, filters are added to portions of the clock distribution. These filters filter the power supply voltage supplied to elements in the clock distribution tree. The clock distribution elements receive a filtered power supply voltage that is different from the power supply voltage supplied to the rest of the circuitry. These filters add delay and cut the noise amplitude of the voltage supply seen by transistors in the clock distribution elements. The filters may also shift the phase of the noise causing some cancellation of the "A" and "B" boxes shown in FIG. 4 previously.

In this embodiment, a power source 90 supplies power to a clock distribution tree 94 (shown by dashed lines) containing various clock distribution elements 96. The voltage from power source 90 is filtered by filter 92 before it arrives at the various clock distribution elements 96. A clock generator, such as a phase locked loop, 60 supplies a clock signal to the clock distribution tree 94. These clock signals leave the clock distribution tree 94 and may connect to various storage elements and other elements in the rest of the circuitry. Filters 92 are distributed throughout the clock distribution tree 94. Although FIG. 11 shows a filter 92 connected to one or four clock distribution elements, the present invention is not limited by this and filters 92 may be connected to just one, two, or any number of clock distribution elements 96.

Methods and apparatus for optimizing clock distribution in a circuit to reduce the effect of power supply noise may be implemented in a simulation to analyze the effects and possible solutions to power supply droop (for example, by using a MATLAB simulator), and/or actual circuitry may be designed.

The present invention has been illustrated using an example embodiment of a single cycle data path delay. However, the present invention is not limited to single cycle data path delay but may be applied to any other data path delays that are within the spirit and scope of the present invention, for example, multiple cycle data path delays, multiple half cycle data path delays, single half cycle data path delays, etc.

Methods and apparatus for optimizing clock distribution in a circuit to reduce the effect of power supply noise are advantageous in that less on-die capacitance to reduce power supply droop needs to be dedicated since the maximum impact of voltage noise is not felt by the circuitry. Therefore, a higher frequency of operation may be achieved at lower leakage power. Moreover, with less on-die capacitors, a smaller silicon area is needed. During design, visualization may be used to quickly explore the solution space and verify compensation techniques.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for optimizing clock distribution in a circuit to reduce the effect of power supply noise comprising:
   determining a response curve of a power source for a circuit;
   determining a delay sensitivity of a clock net in the circuit to the power source;
   determining a delay sensitivity of a data net in the circuit to the power source;
   determining a data delay for the data net;
   determining a clock delay for the clock net; and
   adjusting the clock delay to reduce the effect of power supply noise on the data net, the adjusting being based on the response curve of the power source, the delay sensitivity of the clock net, the delay sensitivity of the data net, the data delay, and the clock delay.

2. The method according to claim 1, further comprising defining a clock frequency of the circuit; and using the clock frequency in determining the adjusting.

3. The method according to claim 1, further comprising adjusting the clock delay by adding a pre-distribution clock delay based on the response curve of the power source, the sensitivity of the clock net, the sensitivity of the data net, the data delay, and the clock delay.

4. The method according to claim 3, further comprising determining a delay of the pre-distribution clock delay net, determining a sensitivity of he pre-distribution clock delay net, and basing the adjusting on the delay of the pre-distribution clock delay net and the sensitivity of the pre-distribution clock delay net.

5. The method according to claim 3, further comprising adding the pre-distribution clock delay at the beginning of a clock distribution tree that includes the clock net.

6. The method according to claim 1, further comprising performing the first determining step through the fifth determining step using a simulator.

7. The method according to claim 6, further comprising performing the first determining step through the fifth determining step using a software simulator.

8. A circuit on a die for optimization of clock delay to minimize the effect of power supply noise comprising:
   a clock generator;
   a clock tree comprising a plurality of clock nets;
   at least one delay element connected between the clock generator and the clock tree, the at least one delay element delaying a clock signal from the clock generator to the clock tree; and
   at least two storage devices, the at least two storage devices storing data received upon receipt of the clock signal,
   wherein the delay caused by the at least one delay element is set to provide a delay of the clock signal that minimizes the effect of noise from a power source on the clock signal as it travels along the clock nets and on the data as it travels along a data path between two of the at least two storage devices,
   wherein the delay caused by the at least one delay element is set based at least in part on the delay and sensitivity of the clock nets, the delay and sensitivity of the data paths, and a transient voltage droop curve for the power supply.

9. The circuit according to claim 8, wherein the clock generator comprises a phase locked loop (PLL) device.

10. The circuit according to claim 8, wherein the at least one delay element comprises at least one of a transistor, a logic gate, and a Field Effect Transistor (FET).

11. The circuit according to claim 8, wherein the at least two storage devices comprise latches.

12. A circuit on a die for optimization of clock delay to minimize the effect of power supply noise comprising:
    a clock generator;
    a clock tree comprising a plurality of clock nets;
    at least two storage devices, the at least two storage devices storing data received upon receipt of a clock signal from the clock generator; and
    at least one filter element connected between a power source and at least one element transferring the clock signal in the plurality of clock nets, the at least one filter element filtering noise from the power source,
    wherein the design of the filter is based at least in part on the delay and sensitivity of the clock nets, the delay and sensitivity of the data paths, and a transient voltage droop curve for the power source.

13. The circuit according to claim 12, wherein the clock generator comprises a phase locked loop (PLL) device.

14. The circuit according to claim 12, wherein the at least two storage devices comprise latches.

15. A processor microcircuit comprising:
    a clock generator;
    a clock tree comprising a plurality of clock nets;
    at least one delay element connected between the clock generator and the clock tree, the at least one delay element delaying a clock signal from the clock generator to the clock tree; and
    at least two storage devices, the at least two storage devices storing data received upon receipt of the clock signal,
    wherein the delay caused by the at least one delay element is set to provide a delay of the clock signal that minimizes the effect of noise from a power source on the clock signal as it travels along the clock nets and on the data as it travels long a data path between two of the at least two storage devices,
    wherein the delay caused by the at least one delay element is set based at least in part on the delay and sensitivity of the clock nets, the delay and sensitivity of the data paths, and a transient voltage droop curve for the power supply.

16. The processor according to claim 15, wherein the clock generator comprises a phase locked loop (PLL) device.

17. The processor according to claim 15, wherein the at least one delay element comprises at least one of a transistor, a logic gate, and a Field Effect Transistor (PET).

18. The processor according to claim 15, wherein the at least two storage devices comprise latches.

19. A method for optimizing clock distribution in a circuit to reduce the effect of power supply noise comprising:
    determining a transient curve for a power supply voltage droop, a delay and sensitivity of a pre-distribution, a delay and sensitivity of a clock distribution for a clock signal, and a delay and sensitivity of a data path, the clock signal comprising a plurality of clock pulses;
    deriving normalized sensitivity curves for the pre-distribution, the clock distribution, and the data path;
    computing the delay error due to propagation of generation clock edge through the pre-distribution and the clock distribution by integrating the normalize sensitivity curve for pre-distribution and the normalized sensitivity curve for the clock distribution for each clock pulse;

computing the delay modulation for the data path by integrating the normalized sensitivity curve for the data path at a first clock pulse, the first clock pulse representing when the power supply voltage droop begins;

computing the delay error due to propagation of sampling clock edge through the pre-distribution and the clock distribution by integrating the normalized sensitivity curve for the pre-distribution and the normalized sensitivity curve for the clock distribution;

computing the net timing loss for the first clock pulse by summing the integrals resulting from the first computing step, the second computing step, and t third computing step; and repeating all computing steps for each successive clock pulse until a desired number of clock pulses have been completed.

20. The method according to claim 19, further comprising constructing a net timing loss curve to identify a maximum timing loss.

21. The method according to claim 20, further comprising revising at least one of the pre-distribution delay and the pre-distribution sensitivity based on the maximum timing loss.

* * * * *